United States Patent

Spani

[15] 3,706,878

[45] Dec. 19, 1972

[54] EXCESS 3 TO BCD CODE CONVERTER

[72] Inventor: Wayne Spani, San Diego, Calif.

[73] Assignee: Eastman Kodak, Rochester, N.Y.

[22] Filed: March 16, 1971

[21] Appl. No.: 124,684

[52] U.S. Cl. ............................235/155, 340/347 DD
[51] Int. Cl. ................................................H04l 3/00
[58] Field of Search...........235/155, 92; 340/347 DD

[56] References Cited

UNITED STATES PATENTS

| | | | |
|---|---|---|---|
| 2,877,447 | 3/1959 | Kenrich | 235/155 |
| 3,153,228 | 10/1964 | Winkler | 235/155 |

OTHER PUBLICATIONS

Frim & Miller, "Here Are More Digital Converters" Electronic Design 25, Dec. 6, 1969 pg. 87.

*Primary Examiner*—Daryl W. Cook
*Assistant Examiner*—Jeremiah Glassman
*Attorney*—W. H. J. Kline and Raymond L. Owens

[57] ABSTRACT

An excess 3 to binary coded decimal converter is described which includes a plurality of EXCLUSIVE-OR gates and means for coupling the EXCLUSIVE-OR gates so that in response to excess 3 coded input signals, the EXCLUSIVE-OR gates provide binary coded decimal output signals.

6 Claims, 1 Drawing Figure

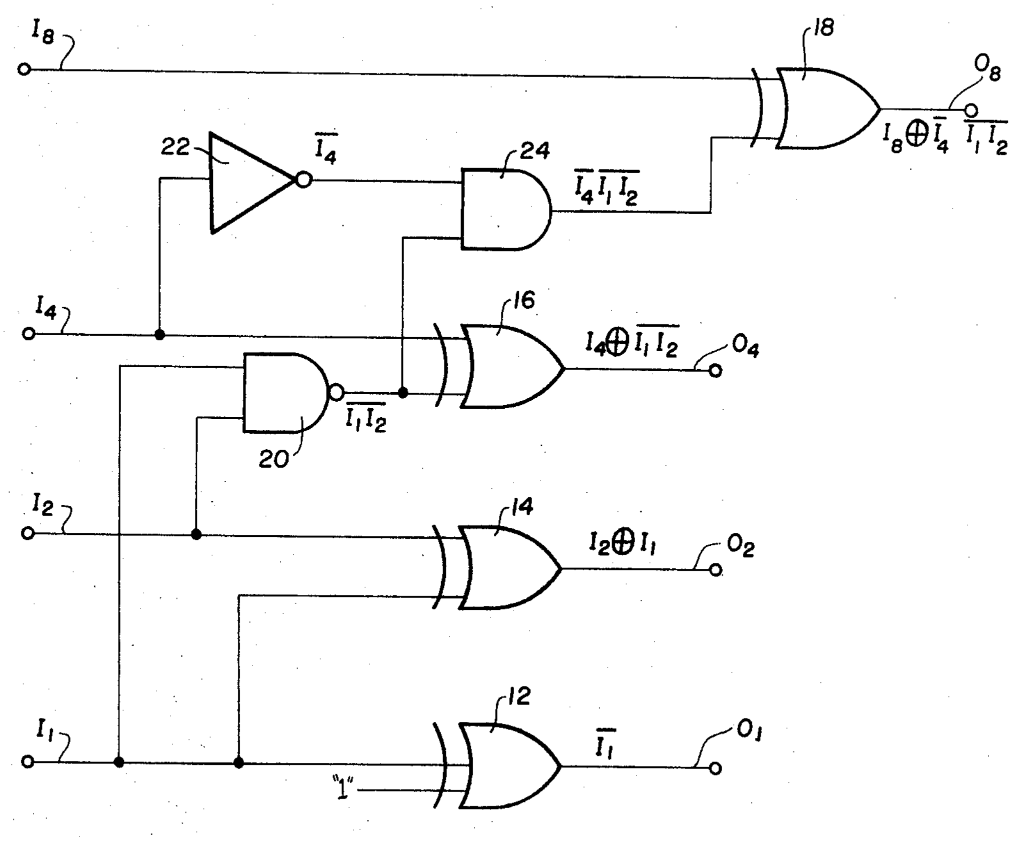
WAYNE SPANI
INVENTOR.
BY Raymond L. Owens
W. H. J. Kline
ATTORNEYS

EXCESS 3 TO BCD CODE CONVERTER

CROSS REFERENCE TO RELATED APPLICATIONS

Reference is made to commonly assigned copending U.S. Pat. application, Ser. No. 124,683, entitled "BCD to Excess 3 Code Converter" filed contemporaneously herewith in the name of Wayne Spani.

BACKGROUND OF THE INVENTION

The present invention relates to code converting apparatus and particularly to excess 3 to binary coded decimal code converters.

Often within computing apparatus, an excess 3 code is used where it is desired to perform arithmetic operations by the method of compliments. Thereafter, the excess 3 code is converted to a binary coded decimal code (BCD). A conventional excess 3 to BCD code converter using 13 gates is shown on page 87 of "Electronics Design," Vol. 17, No. 25, Dec. 6, 1969 which was designed by a systematic procedure employing Karnaugh maps.

SUMMARY OF THE INVENTION

In the disclosed embodiment of the invention, an excess 3 to BCD converter includes a plurality of EXCLUSIVE-OR gates adapted to receive as inputs excess 3 coded input signals $I_1$, $I_2$, $I_4$, and $I_8$ and circuit means for coupling the EXCLUSIVE-OR gates so that they provide BCD output signals $O_1$, $0_2$, $O_4$, and $O_8$ in accordance with the following Boolean relationships between the input and the output signals.

1. $O_1=\overline{I_1}$
2. $O_2=I_2 \phi I_1$
3. $O_4=I_4 \phi \overline{I_1 I_2}$
4. $O_8=I_8 \phi \overline{I_4}\,\overline{I_1 I_2}$ A feature of the invention is that excess 3 to BCD code conversion is accomplished with substantial savings in the number of logic gates used. Other objects and advantages will become more apparent from the detailed description of a preferred embodiment.

BRIEF DESCRIPTION OF THE DRAWING

In the detailed description of the preferred embodiment of the invention presented below, reference is made to the accompanying drawing which depicts a block diagram of an excess 3 to BCD code converters in accordance with the invention. The symbols for the logic components shown in the drawing are in accordance with the American Standard Graphical Symbols for Logical Diagrams (ASA Y 32.14–1962).

DESCRIPTION OF THE PREFERRED EMBODIMENT

To facilitate an understanding of the present invention, the BCD and excess 3 codes will be first briefly reviewed in conjunction with Table I and Table II which show for the decimal digits 0 –9 (left column) the BCD and excess 3 equivalent respectively.

TABLE I

| Decimal Digit | Binary Coded Decimal Code $O_8 O_4 O_2 O_1$ |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

TABLE II

| Decimal Digit | Excess 3 Code $I_8 I_4 I_2 I_1$ |
|---|---|
| 0 | 0011 |
| 1 | 0100 |
| 2 | 0101 |
| 3 | 0010 |
| 4 | 0111 |
| 5 | 1000 |
| 6 | 1001 |
| 7 | 1010 |
| 8 | 1011 |
| 9 | 1100 |

As shown by Table II, the excess 3 code is a self-complimenting code. More specifically, the nine's compliment of a decimal digit expressed in excess 3 code may be obtained by complimenting each particular individual bit. For example, for the decimal digit 1, the excess 3 code representation is the number 0100 whose compliment on an individual bit basis is 1011 which in the excess 3 code has a decimal equivalent of 8.

Referring now to the drawing, there is shown an excess 3 to BCD code converter having a plurality of input terminals for a plurality of excess 3 input signals $I_1$, $I_2$, $I_4$, and $I_8$ respectively and a plurality of output terminals for a plurality of BCD output signals $O_1$, $O_2$, $O_4$, and $O_8$ respectively. The converter 10 includes a plurality of EXCLUSIVE-OR gates 12, 14, 16, and 18. Boolean Algebra is well known to those skilled in the art to express the output signals of combinational logic systems in terms of its input signals. Upon analysis using Boolean Algebra (see Hill and Peterson, Introduction to Switching Theory Logic Design, 1968), the disclosed code converter solves the four following Boolean equations which present a mathematical model of the converter 10 and convert the excess 3 code of Table II into the BCD code of Table I.

Equations: 1. $O_1=\overline{I_1}$

2. $O_2=I_2 \phi I_1$
3. $O_4=I_4 \phi \overline{I_1 I_2}$
4. $O_8=I_8 \phi \overline{I_4}\,\overline{I_1 I_2}$ Again referring specifically to the drawing, EXCLUSIVE-OR gate 12 is responsive to only the input signal $I_1$ and thus provides an inverter function. The gate 12 provides the output signal $O_1$ to satisfy equation 1. The EXCLUSIVE-OR gate 12 could be replaced by a signal inverter and still solve Equation 1. The input signal $I_1$ is also provided as an input to the EXCLUSIVE-OR gate 14 and a NAND gate 20. The EXCLUSIVE-OR gate 14 also receives input signal $I_2$ and provides an output signal $O_2$ which satisfies Equation 2. NAND gate 20 also receives the signal $I_2$ as an input and produces a first reference signal having the Boolean representation $\overline{I_1 I_2}$ which is provided as an input to the EXCLUSIVE-OR gate 16. The EXCLUSIVE-OR gate 16 also is responsive to the input signal $I_4$ and produces an output signal $O_4$ which satisfies equation 3. The first reference signal from the NAND gate 20 is also directly coupled to the input of an AND gate 24. An inverter 22 receives the input signal $I_4$ and provides the inverter signal $\overline{I_4}$ as an input to the AND gate 24. The AND gate 24 develops a second reference signal $\bar{I}_4 \cdot \overline{I_1 I_2}$ which is provided as an input to the EXCLUSIVE-OR gate 18. The EXCLUSIVE-OR gate 18 in response to the output of the AND gate 24 and the input signal $I_8$ produces the output signal $O_8$ which solves equation 4.

Although the disclosed embodiment of the present invention uses a plurality of EXCLUSIVE-OR gates, it will be understood to those skilled in the art that the EXCLUSIVE-OR function may also be realized by the correct selection of a number of other combination of gates.

The invention has been described in detail with particular reference to a preferred embodiment, but it will be understood that variations and modifications can be effected within the spirit and scope of the invention.

I claim:

1. In an excess 3 to BCD code converter for converting excess 3 input signals $I_1$, $I_2$, $I_4$, and $I_8$ to BCD output signals $O_1$, $O_2$, $O_4$, and $O_8$, the combination comprising:

a. a plurality of EXCLUSIVE-OR means;

b. circuit means defining a plurality of input terminals for the excess 3 input signals $I_1$, $I_2$, $I_4$, and $I_8$ and a plurality of output terminals for the BCD output terminals $O_1$; $O_2$, $O_4$, and $O_8$; and c. means for coupling said EXCLUSIVE-OR means to said terminals to establish the following Boolean relationships between the input signals and output signals:

1. $O_1 = \bar{I}_1$
2. $O_2 = I_2 \phi I_1$
3. $O_4 = I_4 \phi \overline{I_1 I_2}$
4. $O_8 = I_8 \phi \bar{I}_4 \overline{I_1 I_2}$

2. In an excess 3 to BCD code converter for converting excess 3 input signals $I_1$, $I_2$, $I_4$, and $I_8$ to BCD output signals $O_1$, $O_2$, $O_4$, and $O_8$, the combination comprising:

a. at least three EXCLUSIVE-OR gates;

b. a plurality of input terminals for the excess 3 input signals $I_1$, $I_2$, $I_4$, and $I_8$ and a plurality of output terminals for the BCD output terminals $O_1$, $O_2$, $O_4$, and $O_8$; and c. means coupling said EXCLUSIVE-OR means to said terminals to satisfy the following Boolean relationships between the input signals and output signals:

1. $O_1 = \bar{I}_1$
2. $O_2 = I_2 \phi I_1$
3. $O_4 = I_4 \phi \overline{I_1 I_2}$
4. $O_8 = I_8 \phi \bar{I}_4 \overline{I_1 I_2}$

3. In an excess 3 to BCD code converter for converting excess 3 input signals $I_1$, $I_2$, $I_4$, and $I_8$ to BCD output signals $O_1$, $O_2$, $O_4$, and $O_8$, the combination comprising:

a. inverting means responsive to the $I_1$ signal for providing the $O_1$ signal;

b. first EXCLUSIVE-OR gate means responsive to the $I_1$ and $I_2$ signals for providing the $O_2$ signal;

c. means responsive to the $I_1$ and $I_2$ signals for providing a first reference signal;

d. second EXCLUSIVE-OR gate means responsive to the $I_4$ signal and said first reference signal for providing the $O_4$ signal;

e. means responsive to said first reference signal and said $I_4$ signal for providing a second reference signal; and f. third EXCLUSIVE-OR gate means responsive to said second reference signal and the $I_8$ signal for providing the $O_8$ signal.

4. The invention as set forth in claim 3 wherein said inverting means comprises an EXCLUSIVE-OR gate.

5. The invention as set forth in claim 3 wherein said first reference signal means comprises a NAND gate.

6. The invention as set forth in claim 5 wherein said second reference signal providing means comprises;

a. an inverter responsive to the $I_4$ signal to provide an inverted $I_4$ signal; and b. an AND gate responsive to said first reference signal and said inverted $I_4$ signal to provide said second reference signal.

* * * * *